(12) United States Patent
Sip

(10) Patent No.: US 8,369,989 B2
(45) Date of Patent: Feb. 5, 2013

(54) ROBOT WITH AN AUTOMATIC CHARGING FUNCTION

(75) Inventor: Kim-Yeung Sip, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 820 days.

(21) Appl. No.: 12/533,008

(22) Filed: Jul. 31, 2009

(65) Prior Publication Data

US 2010/0174434 A1    Jul. 8, 2010

(30) Foreign Application Priority Data

Jan. 8, 2009    (CN) .......................... 2009 1 0300114

(51) Int. Cl.
*H02J 7/00* (2006.01)
*B25J 3/04* (2006.01)
*B25J 18/02* (2006.01)
*G06F 19/00* (2011.01)

(52) U.S. Cl. ............ 700/245; 701/23; 320/109; 901/50; 901/1; 74/490.02

(58) Field of Classification Search ............. 901/15, 901/1, 50; 320/108, 109, 107; 74/490.02, 74/490.03, 490.01, 490.05, 490.07, 490.08; 318/568.21; 700/245; 701/23
See application file for complete search history.

(56) References Cited

U.S. PATENT DOCUMENTS

| | | | | |
|---|---|---|---|---|
| 5,272,431 A * | 12/1993 | Nee | ................ | 320/109 |
| 5,598,084 A * | 1/1997 | Keith | ................ | 320/109 |
| 7,202,630 B2 * | 4/2007 | Dan | ................ | 320/115 |
| 7,894,940 B2 * | 2/2011 | Kumhyr | ................ | 700/248 |
| 2002/0124343 A1 * | 9/2002 | Reed | ................ | 15/319 |
| 2007/0142972 A1 * | 6/2007 | Abramson et al. | ................ | 700/259 |

\* cited by examiner

*Primary Examiner* — Thomas Black
*Assistant Examiner* — Christine Behncke
(74) *Attorney, Agent, or Firm* — Altis Law Group, Inc.

(57) ABSTRACT

A robot with an automatic charging function, comprising: a body, an arm mechanism rotatably connected to the body, a head mechanism and a driver rotatably connected to the arm mechanism; wherein a receiving space is formed in the body for receiving the arm mechanism; the head mechanism comprises two conduction terminals for receiving power from power outlets of a charging station; when power of the robot is lower than a preset level, the driver is configured to drive the arm mechanism to rotate out of the receiving space of the body, simultaneously, the driver is configured to drive the head mechanism to rotate relatively to the arm mechanism till the two conduction terminals of the head mechanism are electronically connected to the power outlets of the charge station, thereby receiving power from the charge station.

4 Claims, 7 Drawing Sheets

ROBOT WITH AN AUTOMATIC CHARGING FUNCTION

BACKGROUND

1. Technical Field

The present disclosure relates to a robot with an automatic charging function.

2. Description of Related Art

In general, users can use a robot to implement a plurality of operations, such as, component conveying, assembly operation, and so on. However, when power of a chargeable battery of the robot is lower than a preset level, the robot will stop to work until the user replenishes power for it.

Generally, when replenishing power for the robot, the user must move the robot and electronically connect the robot to power outlets of a charging station, and then charge the robot. However, it is trivial and time-consuming.

Therefore, what is needed is a robot capable of automatically charge itself.

DETAILED DESCRIPTION

Figure 1:
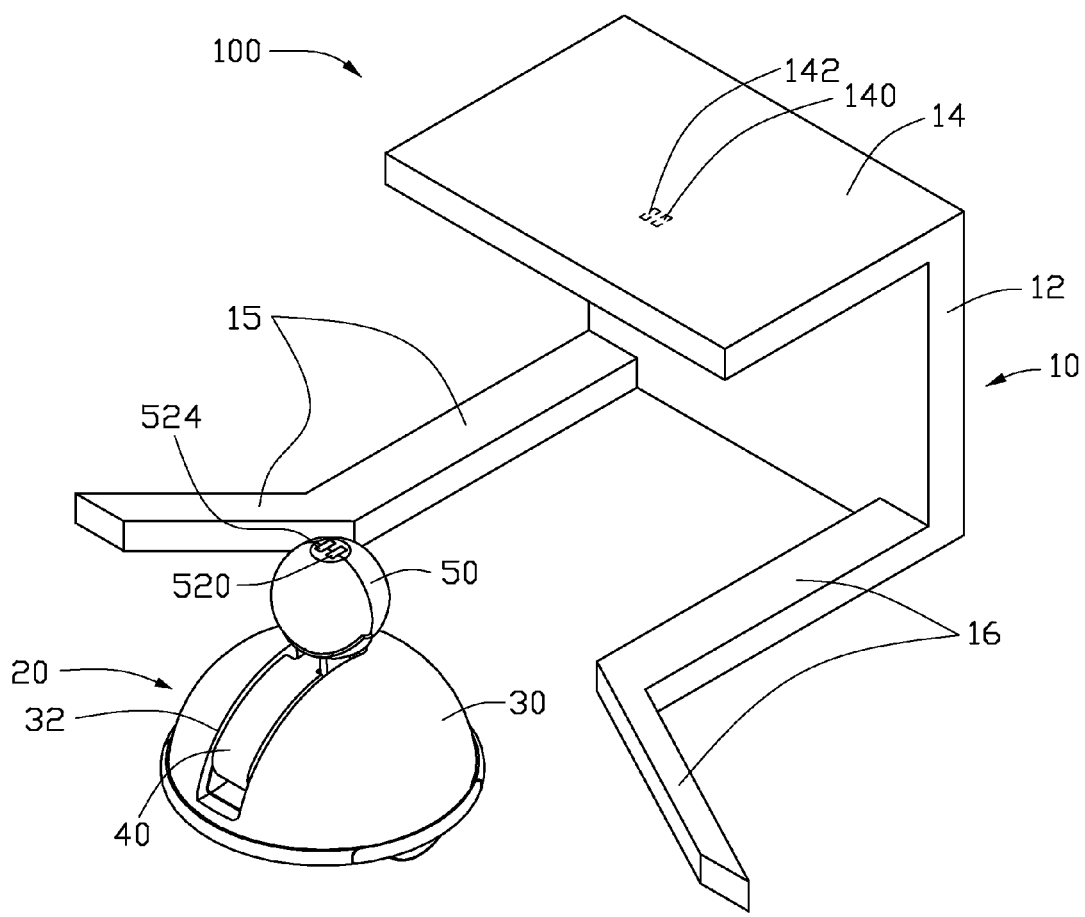
FIG. 1 is an isometric view of a robot placed under a charging station in accordance with an exemplary embodiment.
Figure 2:
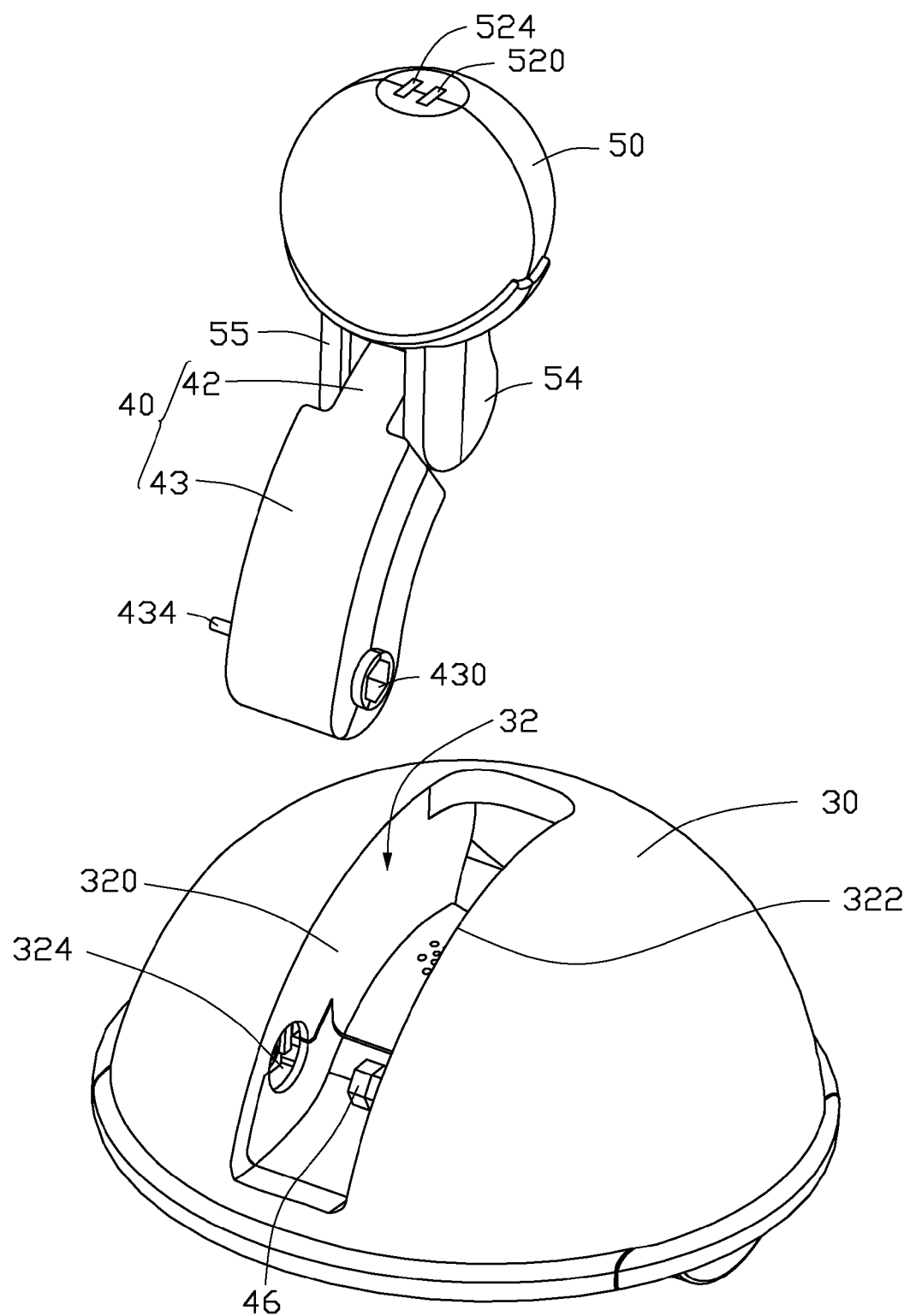
FIG. 2 is an isometric view of the robot of FIG. 1 in accordance with an exemplary embodiment.
Figure 3:
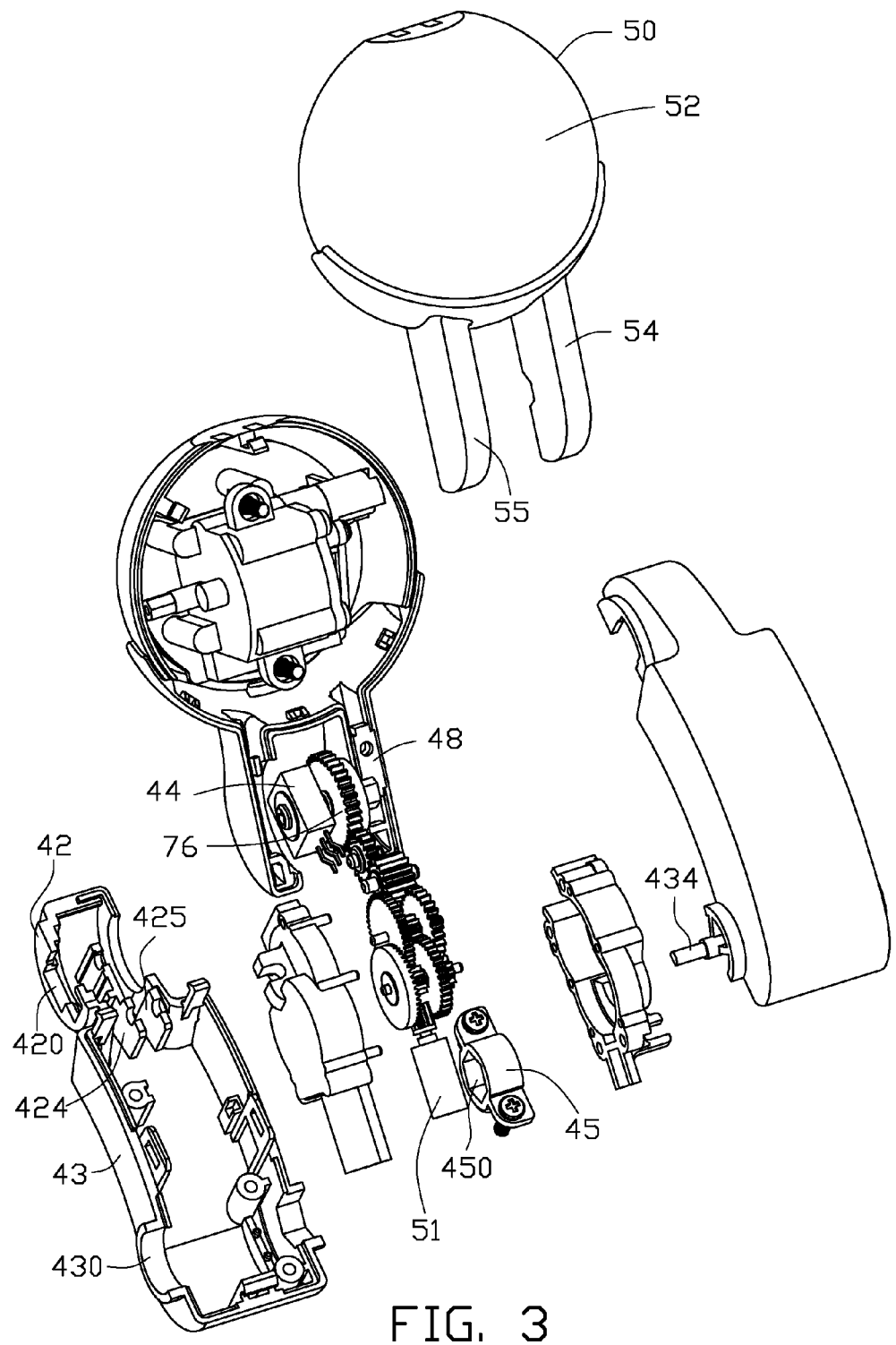
FIG. 3 is an exploded view of an arm mechanism and a head mechanism of the robot of FIG. 2.
Figure 4:
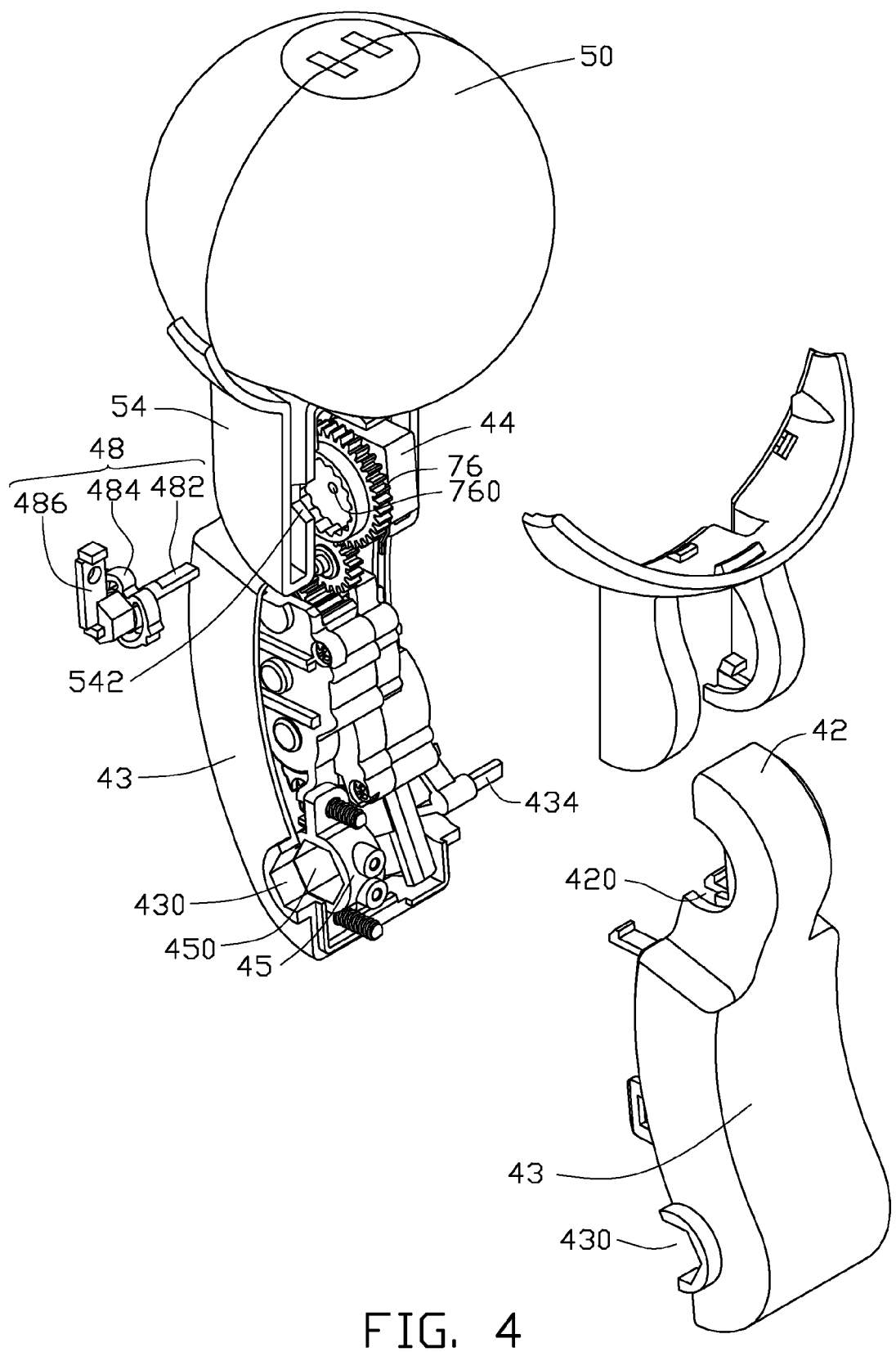
FIG. 4 is an exploded view of an arm mechanism and a head mechanism of the robot of FIG. 2, viewed from another aspect.
Figure 5:
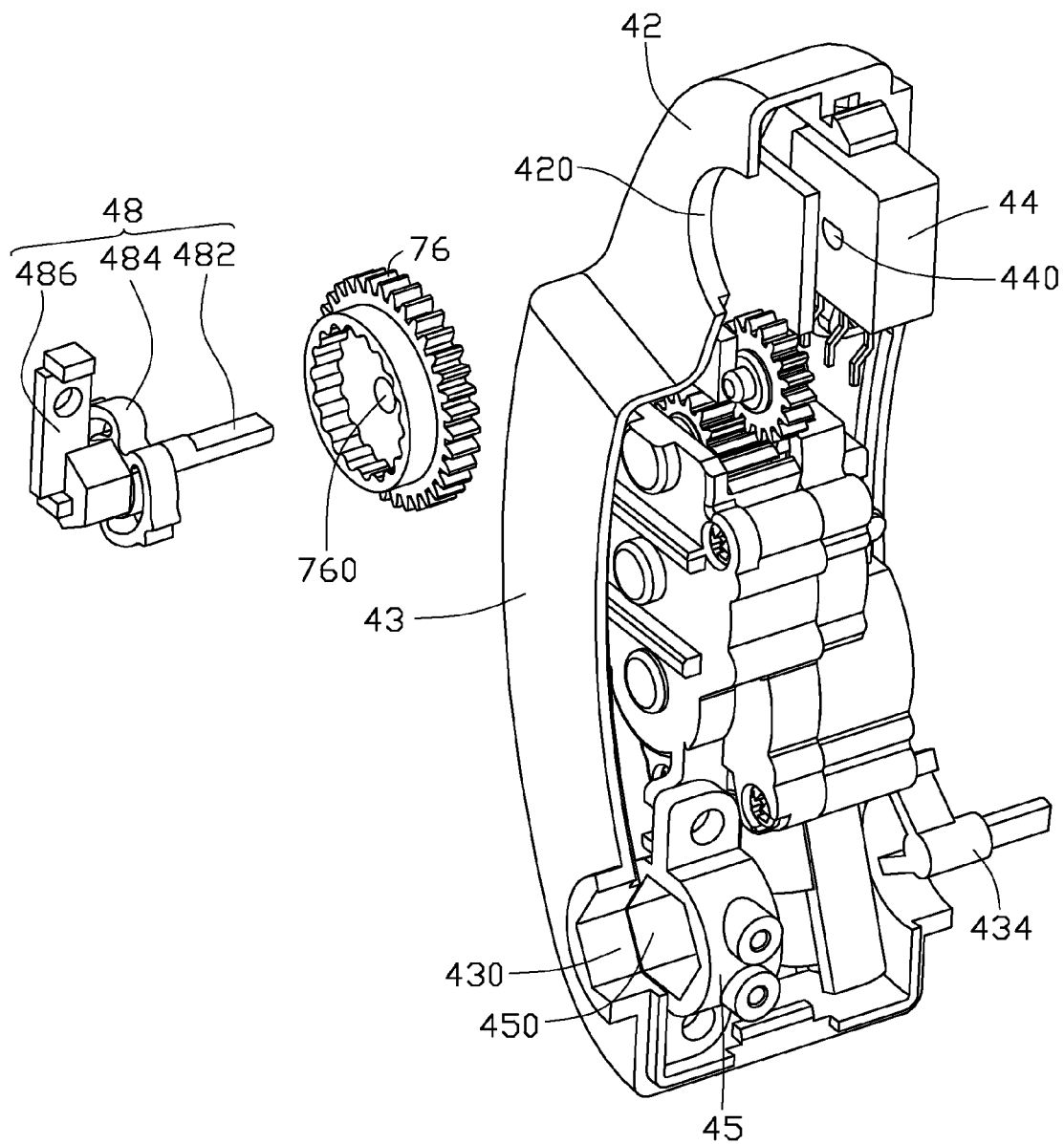
FIG. 5 is a partly exploded view of the arm mechanism of FIG. 2.
Figure 6:
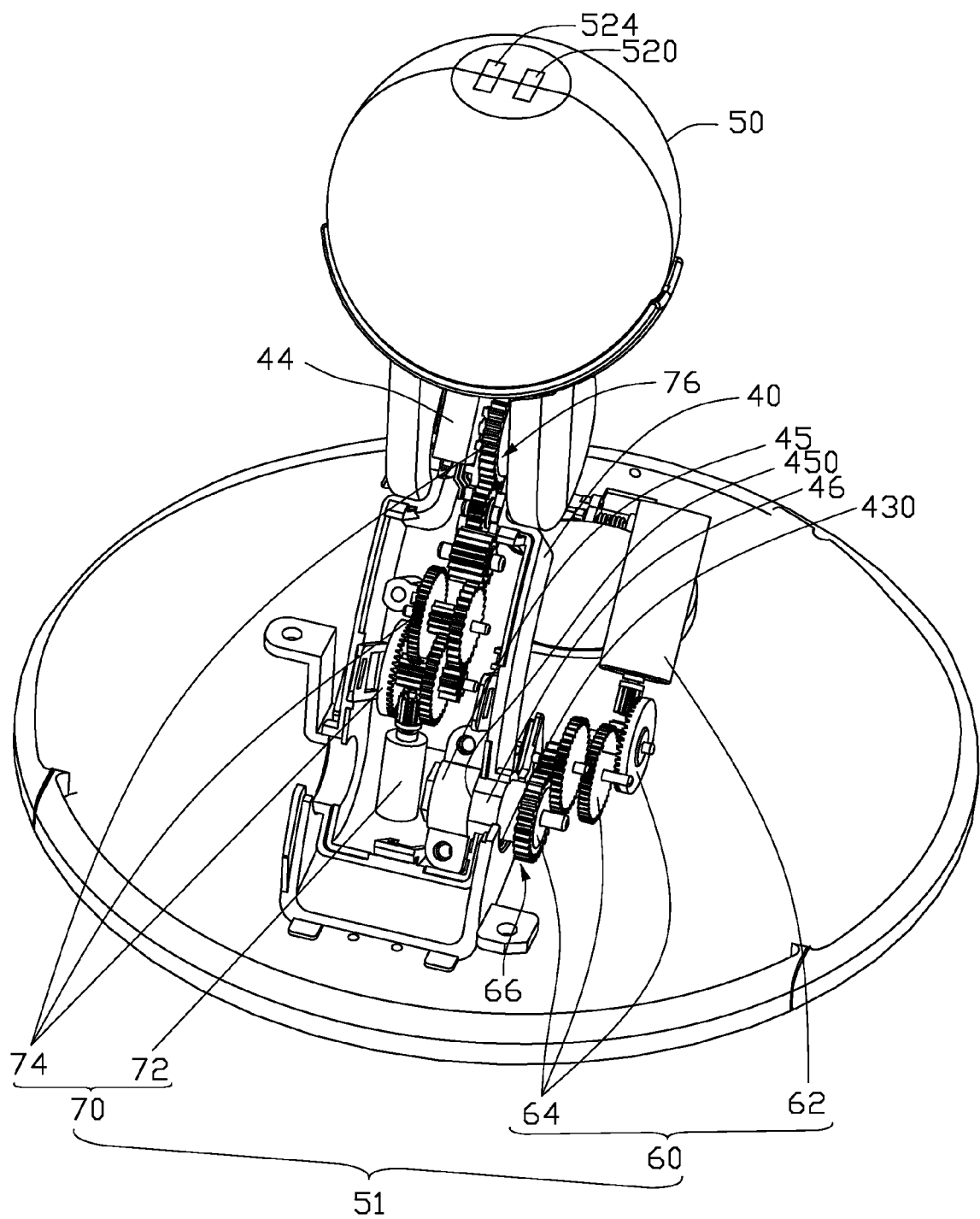
FIG. 6 is a partly exploded view of the robot of FIG. 2.
Figure 7:
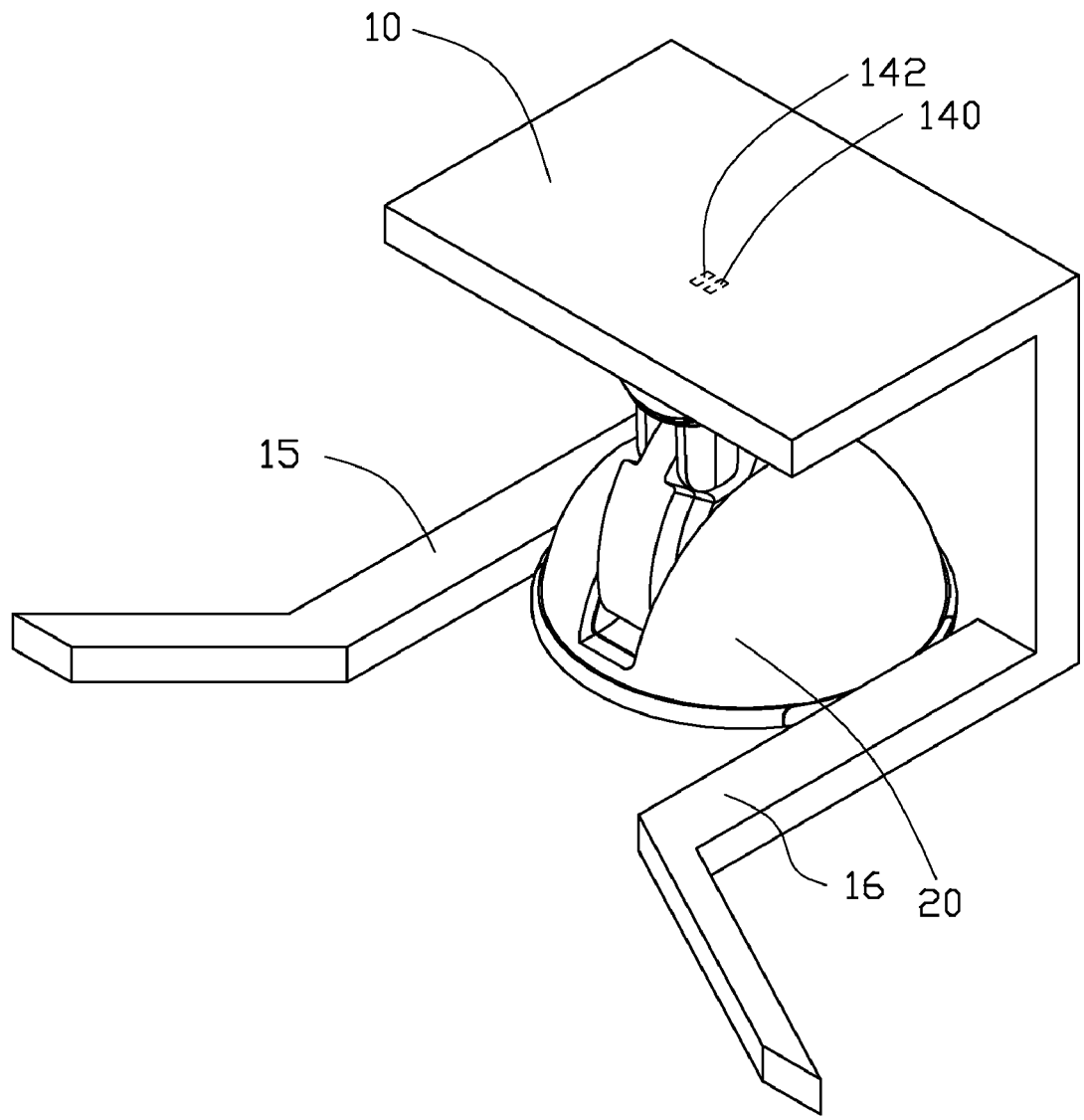
FIG. 7 is an isometric view diagram of the robot in the charging.

FIG. 1 is an isometric view of a robot 20 placed under a charging station 10 in accordance with an exemplary embodiment. The robot 20 is capable of charging itself by absorbing power from the charging station 10.

The charging station 10 includes a supporting plate 12, a top plate 14, two guide plates 15 and 16. The supporting plate 12 has a lower end and a higher end. The top plate 14 is secured to the higher end of the supporting plate 12 and the two guide plates 15 and 16 are symmetrically secured to the lower end of the supporting plate 12 and apart from each other for a distance to accommodate the robot 20. Two power outlets 140 and 142, are located in the top plate 14, and configured to provide power for the robot 20 when the robot 20 is accommodated between the guide plates 15 and 16 for a charge.

Referring to FIGS. 2-6, the robot 20 includes a body 30, an arm mechanism 40, an axis 46, a hinge element 48, a head mechanism 50, and a driver 51. One end of the axis 46 is rotatably coupled to the body 30, and another end of the axis 46 is rotatably coupled to the arm mechanism 40, so as that, the arm mechanism 40 is rotatable relatively to the body 30. The head mechanism 50 is rotatably mounted on the arm mechanism 40 via the hinge element 48. The driver 51 includes a first driver mechanism 60 and a second driver mechanism 70. The first driver mechanism 60 includes a motor 62. The second driver mechanism 70 includes a motor 72. When the motor 62 rotates, the first driver mechanism 60 is configured to drive the arm mechanism 40 to rotate relatively to the body 30. When the motor 72 rotates, the second driver mechanism 70 is configured to drive the head mechanism 50 to rotate relatively to the arm mechanism 40.

The body 30 has a spherical crown shape. A receiving space 32 is formed in the body 30 for receiving the arm mechanism 40.

The arm mechanism 40 is rotatably installed in the body 30 and can be wholly received in the receiving space 30. The arm mechanism 40 can also be rotated out of the receiving space 32.

The arm mechanism 40 includes a first connection portion 42, a second connection portion 43 connected to the first connection portion 42, a control box 44 located in the arm mechanism 40, and a link element 45 connected to the first connection portion 43. The first connection portion 42 is rotatably coupled to the head mechanism 50. The second connection portion 43 is rotatably coupled to the body 30. A first hook portion 424 is located in the first connection portion 42. The control box 44, which is located in the first hook portion 424, is configured to detect a rotation angle of the head mechanism 50 relatively to the arm mechanism 40.

A through hole 430 is defined in the second connection portion 43. An axis 434, which is fixed over and protrudes from the through hole 430 from one side of the second connection portion 43, is located on the second connection portion 43. The receiving space 32 has a first side wall 320 and a second side wall 322 opposite to the first sidewall 320. A through hole 324 is defined in the first side wall 320. The axis 434 is rotatably received in the through hole 324 of the receiving space 32, thereby rotatably fixing the arm mechanism 40 to the body 30.

A through hole 450, which is defined in the link element 45 on one side opposite to the axis 434, is hexagonal shaped and align and conform to the shape of the through hole 430 of the second connection portion 43. An opening (not labeled) is defined in the second side wall 322. The axis 46, with a hexagonal periphery corresponding to holes 430 and 450, is passed through the opening of the second side wall 322 and the through hole 430 of the second connection portion 43, thereby to be fixed to the through hole 450 of the link element 45.

The first driver mechanism 60 is located in the body 30 and includes a gear train 64 which is driven to rotate by the motor 62. The gear train 64 includes a gear 66 installed on the axis 46 and is able to drive the axis 46 to rotate, thereby driving the arm mechanism 40 to rotate relatively to the body 30.

The second driver mechanism 70 is located in the arm mechanism 40 and includes a gear train 74 which is driven to rotate by the motor 72. A second hook portion 425 adjacent to the first hook portion 424 is located in the first connection portion 42. The gear train 74 includes a gear 76, which is rotatably fixed to the second hook portion 425 of the first connection portion 42.

The head mechanism 50 includes a main body 52 and two support portions 54, 55 which support the main body 52. The main body 52 has a globular shape. Two conduction terminals 520 and 524 are disposed on the top of the main body 52 and electronically connected to embedded chargeable batteries (not shown) of the robot 20.

The hinge element 48 includes an axis 482, a joggle portion 484, and a fix portion 486. A through hole 760 is defined in the gear 76. A through hole 440 is defined in the control box 44 and is aligned with the through hole 760 of the gear 76. The axis 482 is passed through the through hole 760 of the gear 76 and the through hole 440 of the control box 44, thereby rotatably fixed to the through hole 440 of the control box 44. The joggle portion 484 is meshed with the gear 76, so as that, when the gear 76 is driven to rotate, it can in turn drive the hinge element 48 to rotate. A hook groove 542 is formed in the support portion 54 of the head mechanism 50 for receiving the fix portion 486. A through hole 420 is defined in the first connection portion 42. The fix portion 486 is passed trough the through hole 420 of the first connection portion 42, and is secured to the hook groove 542 of the support portion 54, so as that, the support portions 54, and 55 are pivotally fixed to the first connection portion 42. When the gear 76 is driven to rotate, the hinge element 48 in turn drives the head mechanism 50 to rotate relatively to the arm mechanism 40.

When the motor 72 rotates, it drives the gear train 74 to rotate, and the gear train 74 drives the head mechanism 50 to rotate relatively to the arm mechanism 40.

When the power of the chargeable batteries of the robot 20 is lower than a preset level, and the robot 20 is accommodated between the guide plates 15 and 16 of the charging station 10, users activates the automatic charging function of the robot 20, for example, the users press a button (not shown) installed on the robot 20 to activate the robot 20 to charge itself. After the automatic charging function is activated, the first driver mechanism 60 drives the arm mechanism 40 to rotate out of the receiving space 32 of the body 30. Simultaneously, the second driver mechanism 70 drives the head mechanism 50 to rotate relatively to the arm mechanism 40 till the conduction terminals 520 and 524 on the top of the head mechanism 50 are electronically connected to the power outlets 140 and 142 of the top plate 14, thereby the chargeable batteries of the robot 20 receiving power from the charging station 10.

When the charging is completed, the second driver mechanism 70 drives the head mechanism 50 to leave the top plate 14 of the charging station 10. Simultaneously, the first driver mechanism 60 drives the arm mechanism 40 to rotate into the receiving space 32 of the body 30.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A robot with an automatic charging function, comprising: a body, an arm mechanism rotatably connected to the body, a head mechanism and a driver rotatably connected to drive the arm mechanism; wherein
    a receiving space is formed in the body for receiving the arm mechanism, the receiving space has a first side wall, and the first side wall defines a through hole;
    the head mechanism comprises conduction terminals for receiving power from power outlets of a charging station;
    when a power of the robot is lower than a preset level, the driver is configured to drive the arm mechanism to rotate out of the receiving space of the body, simultaneously, the driver is configured to drive the head mechanism to rotate relatively to the arm mechanism till the two conduction terminals of the head mechanism are electronically connected to the power outlets of the charge station, thereby receiving power from the charge station;
    wherein the driver includes a first driver mechanism and a second driver mechanism, the first driver mechanism is configured to drive the arm mechanism and the head mechanism to rotate relatively to the body; and the second driver mechanism is configured to drive the head mechanism to rotate relatively to the arm mechanism; and
    the head mechanism further comprises a first connection portion rotatably coupled to the head mechanism, and a second connection portion connected to the first connection portion and rotatably coupled to the body; the second connection portion defines a through hole; an axis, which is fixed over and protrudes from the through hole of the second connection portion, is set in the second connection portion on a first side of the arm mechanism; the axis is rotatably fixed in the through hole of the receiving space, and configured to rotatably fix the arm mechanism to the body.

2. The robot as described in claim 1, wherein the first connection portion is rotatably fixed to the head mechanism; a first hook portion is located in the first connection portion; the arm mechanism further comprises a control box located in the first hook portion of the first connection portion, the control box is configured to detect a rotation angle of the head mechanism relatively to the arm mechanism.

3. The robot as described in claim 2, wherein the second driver mechanism is located in the arm mechanism and comprises a motor and a gear train; the robot further comprises a hinge element, the hinge element comprises an axis, a joggle portion, and a fix portion; the gear train of the second driver comprises a gear; a through hole is defined in the gear; a through hole is defined in the control box and is aligned with the through hole of the gear; the axis is passed through the through hole of the gear and the through hole of the control box, thereby rotatably fixed to the control box; the joggle portion is meshed with the gear and in turn drive the hinge element to rotate when the gear is driven to rotate.

4. The robot as described in claim 3, wherein the head mechanism further comprises two support portions; a hook groove is formed in one support portion of the head mechanism for receiving the fix portion; a through hole is defined in the first connection portion, the fix portion is passed trough the through hole of the first connection portion, and is secured to the hook groove of the support portion, so as that, the two support portions are pivotally fixed to the first connection portion; when the gear is driven to rotate, the hinge element in turn drives the head mechanism to rotate relatively to the arm mechanism.

\* \* \* \* \*